Figure 1:
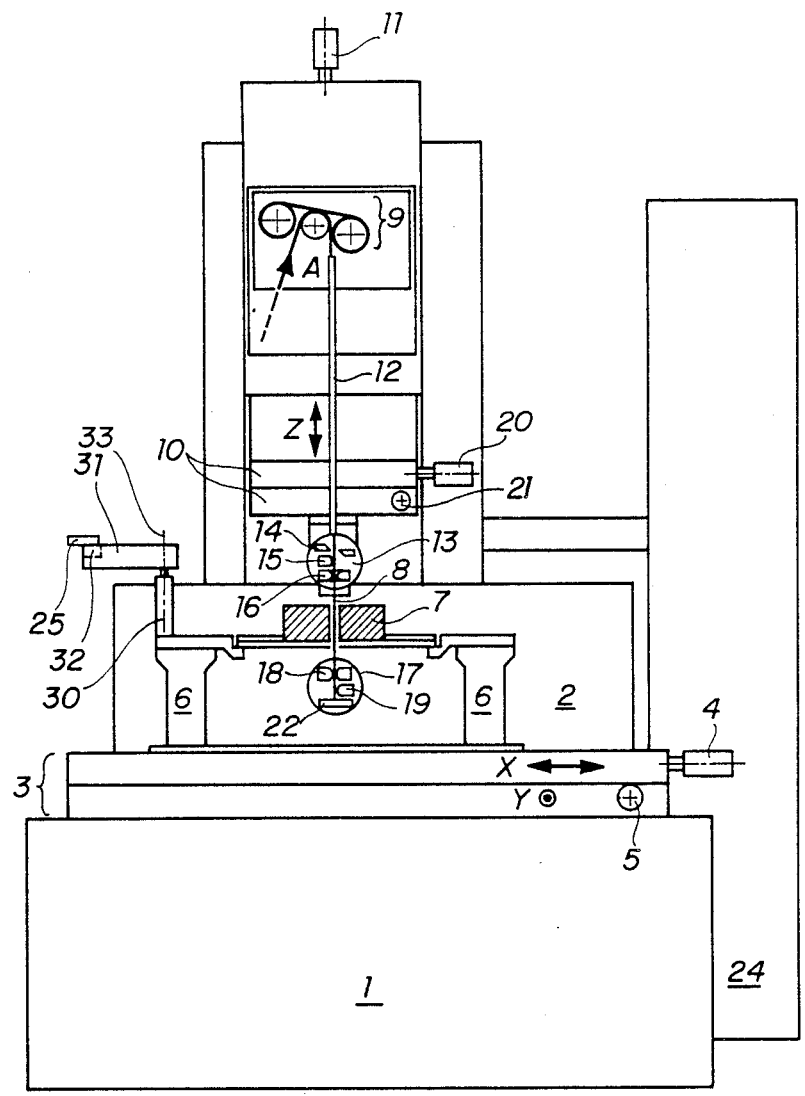

United States Patent [19]

Gambin

[11] Patent Number: 4,980,531
[45] Date of Patent: Dec. 25, 1990

[54] PREHESIVE DEVICE FOR THE ELECTRODE WIRE OF AN EDM CUTTING MACHINE

[75] Inventor: Remi Gambin, Les Collines, France

[73] Assignee: Charmilles Technologies S.A., Meyrin, Switzerland

[21] Appl. No.: 252,779

[22] Filed: Oct. 3, 1988

[30] Foreign Application Priority Data

Oct. 12, 1987 [CH] Switzerland ............... 03981/87
Mar. 23, 1988 [CH] Switzerland ............... 01102/88

[51] Int. Cl.⁵ .................. B23H 7/10; B23H 1/00
[52] U.S. Cl. .................... 219/69.12; 140/139
[58] Field of Search ........... 219/69 W, 69 M, 69.12, 219/69.17; 204/206; 140/139, 147

[56] References Cited

U.S. PATENT DOCUMENTS

| | | | |
|---|---|---|---|
| 3,987,270 | 10/1976 | Ullmann et al. | 219/69.12 |
| 4,242,559 | 12/1980 | Roemer et al. | 219/69 W |
| 4,547,647 | 10/1985 | Schneider | 219/69.12 |
| 4,618,716 | 10/1986 | Inoue et al. | 219/69 W |
| 4,652,716 | 3/1987 | Schneider et al. | 219/69 W |
| 4,778,972 | 10/1988 | Josserand | 219/69 W |
| 4,816,636 | 3/1989 | Obara et al. | 219/69 W |

FOREIGN PATENT DOCUMENTS 2066717 7/1981 United Kingdom ............ 219/69.12

*Primary Examiner*—A. D. Pellinen
*Assistant Examiner*—Geoffrey S. Evans
*Attorney, Agent, or Firm*—Gifford, Groh, Sprinkle, Patmore and Anderson

[57] ABSTRACT

An EDM machine with a travelling wire electrode having a device for straightening and rethreading the wire electrode. The device has a pivotally rotating arm that has a clamp to grasp the free end of the wire after accidental breakage. The clamp applies a tightening stress (optionally the wire is being heated), the wire portion to be discarded is wound on a capstan (configured with circumferential grooves) associated with the clamp on the arm, a wire cutter severs the wire above the capstan, and finally the wire is rethreaded.

9 Claims, 3 Drawing Sheets

PREHESIVE DEVICE FOR THE ELECTRODE WIRE OF AN EDM CUTTING MACHINE

This invention concerns an EDM machine for cutting by means of a wire electrode having a device for gripping the wire electrode arranged to apply a tension to the free end of this wire (after removal of the part of the wire that has already been used or treated), so as to straighten it to facilitate its rethreading, after accidental breakage, through the workpiece to be machined and/or the lower wire guide.

It is known that one of the problem in EDM cutting using a wire electrode running through two closed guides is the accidental breakage of this wire in the work zone between the two guides. After such a breakage, it is necessary to rethread the wire through its lower guide and, if necessary, through the narrow cut the wire has made in the workpiece or through a pilot hole already made in this workpiece when breakage occurs during the threading operation carried out at the beginning of the machining operation. This is difficult without operator intervention, in view of the small size of the openings concerned and the natural tendency of the wire to assume a curved shape, so that the operator has to straighten a certain length of wire and stretch it to reduce its diameter to make rethreading possible. Advanced automation of machining using a wire electrode requires that rethreading of the wire after accidental breakage must be automatic. For this purpose, European patent application No. 201 773 proposes a device located outside the machining area which enables the wire to be held by pulling it, straightening its end, cutting it at the beginning of the straight section thus formed and removing the piece cut off. In order to avoid any interference between the workpiece or the clamps that hold it and this device, it is located before the upper wire guide. Although of low cost when it is provided for at the design stage of a machine, this device cannot be easily installed on existing machines or machines where certain dimensions are limited, in particular because of the space to be provided for spreading out the section to be straightened, which is of a certain length, and which must be located before the gripping (or prehensive) device, which is itself located before the upper wire guide.

The Japanese patent applications published under numbers 56-82133 and 56-82134 describe a rethreading device of different design which uses a cylindrical guide that can be move vertically so as to lead the end of the wire through the workpiece. A component that can pivot horizontally between a rest position and a working position is fixed on the upper machining head. It is placed between the guide (when the guide is in the upper position) and the workpiece and enables the wire to be gripped and cut and the cut end to be allowed to fall before returning to its rest position. The Japanese patent application published under the number 62-18291 describes a removable wire guide in the form of a "clamp" located between the upper machining head and the workpiece. This "clam" (which is a wire guide and therefore does not actually grip the wire) has a large span and is fixed on a vertical support which is itself fixed to the arm holding the upper machining head. A second component, for cutting the wire, is located between the workpiece and the lower wire guide. Both of these types of devices have several disadvantages. Thus, although the lateral movement of the pivoting component obtained by rotation of a carrying arm (first type) or the opening of the "clamp" (second type) causes these components to move out of the machining area proper, it does not change the height or the position of their supports. This results in their taking up a lot of space, a reduction in accessibility and in visibility in the machining area, with a corresponding increase in the risk of collision between the workpiece (or the clamps that hold it) and the gripping component or the arm that carries it. Thus, such collisions remain possible during machining, in particular when the upper surface of the workpiece is not horizontal, and can only be prevented by an electronic control system taking into account the exact shape of the workpiece and the clamps or by upwards retraction of the gripping component and its support. Moreover, the first device is unnecessarily complicated and requires an actuating motor as well as associated mechanical components that are both expensive and bulky. The second device has no component that allows it to exert a pull on the wire and the height of the "clamp" holder must be adjusted to suit the position of the upper machining head. Moreover, neither of these devices provides for removal of the cut ends of wire from the machining tank.

The purpose of the invention is to avoid these disadvantages by means of a device located between the upper wire guide and the workpiece movable so as to park itself in a rest position that prevents any collision with the components located in the tank which can easily be retrofitted to existing EDM machines requiring no supplementary component such as an actuating motor enabling a sufficient tensile force to be applied to the wire to straighten it and stretch it. The straightening and stretching of wire electrodes used in EDM, such as zinc plated copper wires of diameter 0.25 mm or more requires a considerable tensile force of the order of 15 to 20N for example when using a clamp to utilize a s teached in the state of the art, this necessitates a powerful clamp which is therefore of large size.

Another object of this invention is to remove the used wire ends from the machining area, in particular from the work tank. This is achieved by means of the device according to this invention as specified in claim 1.

With a preferred embodiment of the device according to the invention, in which the means for removing the wire sections that have already been used in machining or have been straightened, is a capstan, it is not longer necessary to use a clamp that is powerful and therefore of large size since, owing to the use of a capstan, a tensile force of the order of only a few hundred grams is sufficient to hold the wire, preventing it sliding between the jaws of the clamp. These jaws no longer need to be grooved. The use of smooth jaws and of a wire clamping force that is much smaller than in the case where a capstan is not used, greatly reduces the risks of cutting the wire while it is being stretched and straightened.

Another advantage of the device according to the invention is that all the movements required (except the actuation of the means of gripping the wire) can be carried out using only the means already present on the EDM machine, which are normally used for displacements in the X, X and Z directions during machining.

The presence of these means which are already in existence on practically all wire type EDM machines, is more than enough to position the device according to the invention and for its operation, in particular for winding the used wire around the capstan, so that its installation is therefore at very low cost.

Figure 2:
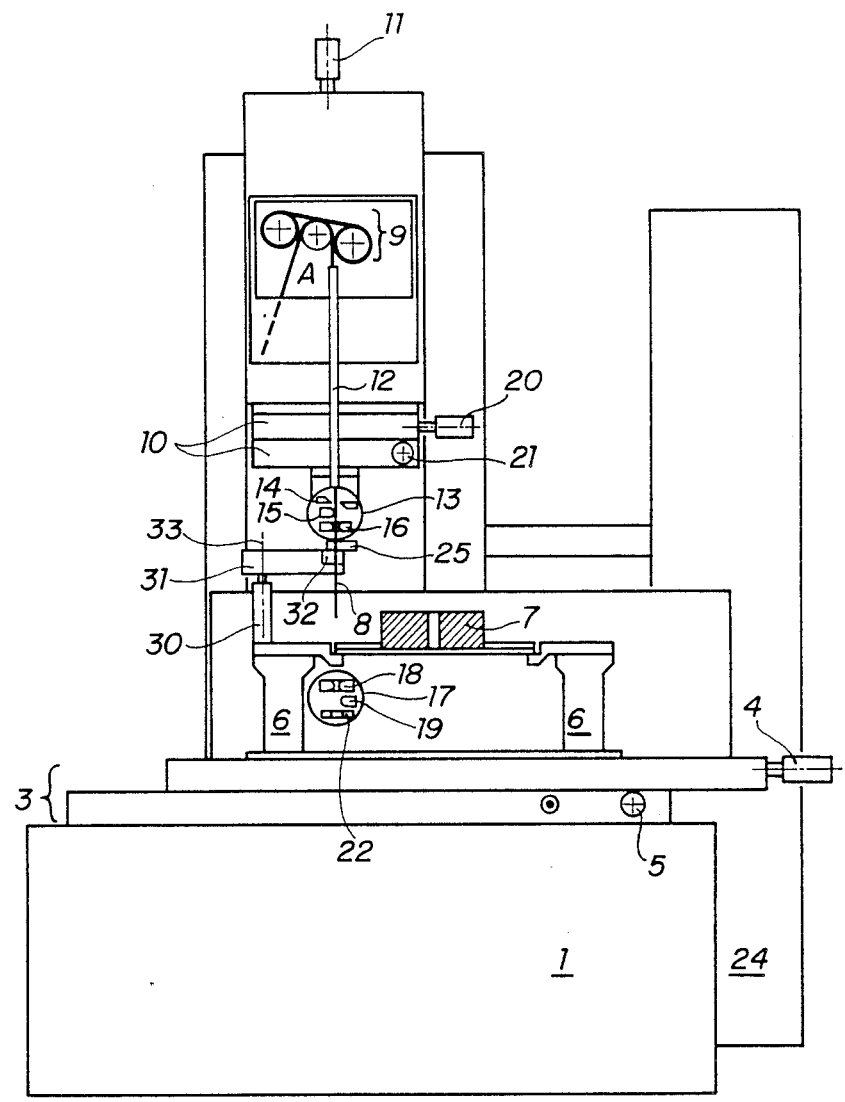

The invention may be illustrated by the description of one method of realization and by means of the drawings in which FIG. 1 is a schematic section of a wire type EDM machine equipped with a device according to the invention FIG. 2 represents the machine of FIG. 1 with certain components in different positions FIGS. 3a, 3b, 3c and 3d represent more detailed views of the clamp and the arm that carries it.

FIG. 1 shows schematically a section of a wire-type EDM machine equipped with a device according to the invention. The reference number 1 indicates the frame of the machine which carries the work tank (2) on the table with cross-slide motion (3) that enables the work tank to be moved in two orthogonal directions X and Y by means of the motors (4) and (5). Inside the work tank (2) a support (6) carries the workpiece to be machined (7).

Machining is carried out by means of a wire electrode (8) running continuously from top to bottom through the workpiece (7). The wire is fed by a known technique in the direction of the arrow from a reel (not shown) and by means of a brake-motor and a belt and pulley drive mechanism (9). The wire then passes through a vertical tube (12) to arrive at the upper machining head (13) which is shown enlarge in schematic form in the drawing. This head is provided with a cutter (14), a current contact (15) and an upper wire guide (16). The assembly formed by the upper machining head (13), the tube (12) and the unit (9) may be moved vertically by means of a motor (11), that is to say in the Z direction orthogonal to the X-Y plane of the table (3) with cross-slide motions. In addition, a second table with cross-slide motions (10) actuated by the motors (20) and (21) allows movement of the upper head and the tube in a plane parallel to the X-Y plane, but with motions of smaller amplitude, in order to incline the wire in the machining zone.

After passing through the wire guide (16), the wire goes through the workpiece (7) and then through a lower wire guide (18) located in the lower machining head (17) which is shown on the drawing in the same way as the upper head (13). The wire then engages in a drive mechanism (22) which is only indicated schematically on the drawing. This mechanism causes the wire to be fed through in a way somewhat similar to the unit (9) and ejects it into a waste bin that is not shown.

The base (30) fixed to the support (6) carries an arm (31) that can pivot about an axis (33) perpendicular to the XY plane. At its free end, this arm carries a clamp (32) and a capstan (25) that are only troughly represented in FIG. 1. The rotation of the arm and the opening and closing of the clamp are carried out by hydraulic or pneumatic actuators that are not shown in FIG. 1. All the motors and the electrical and hydraulic actuating units are controlled by a numerical control unit of known type that is programmed by appropriate software and is housed in a control cabinet (24). The operation of the device according to the invention is now described in more detail.

When the wire (8) breaks during machining, the EDM machine will be in the position shown in FIG. 1 at the moment of breakage. The breakage point (not represented in FIG. 1) will be located in the machining zone, below the upper wire guide (16); the fact that breakage has occurred may be detected in various known ways, for example by monitoring the electrical resistance of the wire between the contacts (15) and (19) or the electrical resistance between the wire and the workpiece or by means of sensors measuring the wire feed rate, located for example on the wire drive mechanism (9), etc. As soon as the control unit detects breakage, the machining and the wire feed are interrupted while the part of the wire below the breakage point is removed by the drive mechanism (22). The upper head (13) is then moved up by means of the motor (11) until it is higher than the arm (31). Then, by running the drive mechanism (9) in reverse, the end of the wire is brought to about 1 cm below the point where it leaves the head (13) by moving the wire above the point of breakage up again until the wire is no longer engaged in the workpiece (7). For this purpose, a measurement can be made, for example, of the electrical resistance between the wire and the workpiece; this resistance will increase suddenly when the wire comes out of the workpiece and therefore no longer touches it. Then, the motors (4) and (5) and a hydraulic actuator controlling the rotation of the arm (31) are operated simultaneously or sequentially so as to bring the clamp (32) in line with the wire guide (16) in the position indicated in FIG. 2. It should be noted that in this figure the part of the wire below the point of breakage has already been removed and that the position of the arm (31) differs by 180° in FIGS. 1 and 2. Evidently, other angles are possible between the two required positions.

Figure 3A:
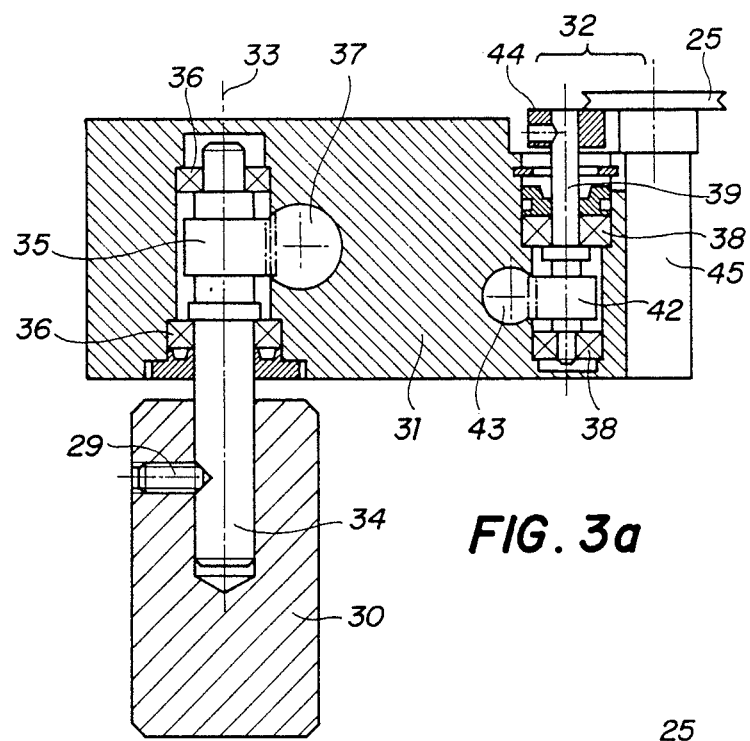
Figures 3B, 3C, 3D:
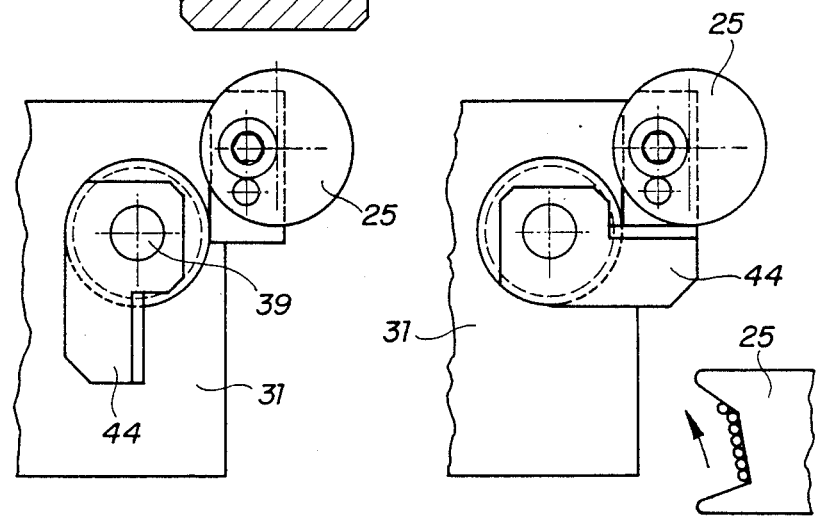

At this point, the clamp (32) grips the free end of the wire. The motors (20) and (21) are then operated so as to wind a certain length of wire around the capstan (25). This length of wire is such that all the wire after point A, whic is located before the tube (12), that is to say the part of the wire that goes through the tube (12) and the head (13), is now after the cutter (14) and will therefore be removed. The section of the capstan (25) is preferably as indicated in FIG. 3d; the shape of the groove allows the turns of wire to be wound on without overlapping and to eject themselves by a spring-back effect once the clamp is opened. Running the drive mechanism (9) in reverse, possibly accompanied by heating (generally Joule effect heating) of the part of the wire inside the tube (12), enables the length of wire before the clamp (32) between the point A and the cutter (14) to be straightened by exerting a tensile force on it accompanied by heating. If desired, this device can cold work and uniformly reduce the diameter of this length of wire to facilitate threading it. The length of wire straightened in this way is new wire that has never been used for machining and has not previously been drawn or cold worked. In particular, in the case of breakage during threading, this device makes it possible to avoid the same length of wire being subjected several times in succession to tensile stresses and any associated heating. The wire is then cut where it leaves the tube (12) by means of the cutter (14). The scrap wire may be removed by causing the arm (31) to rotate by 180° back to the orientation of FIG. 1 and then opening the clamp; the scrap then ejects itself automatically from the capstan as a result of spring-back once it is not longer held between the jaws of the clamp and falls outside the work tank (2). The motors (4), (5) and (11) are then operated to bring the upper machining head (13) back to its machining position just above the workpiece (7) and advancing the wire by means of the drive unit (9) then enables the straightened and possibly reduced and cold worked part of the wire to be threaded through the upper wire guide (16), the workpiece (7) and the lower wire guide (18) as far as the drive mechanism (22). This is arranged in a known way to grip the free end of the wire and then cause it to be fed through at the speed required for machining, which machining may then be resumed normally. Evidently, the sequence of operations described here will in general be controlled automatically by a program stored in the numerical control unit housed in the control cabinet (24).

FIGS. 3a, 3b, 3c and 3d represent two vertical section views and two simplified plan views of one of the possible methods of realization of the capstan (25), the clamp (32), their arm (31) and its base (30). On this base (30) is mounted a shaft (34) fixed by a screw (29). A pinion (35) is pressed on to the shaft (34). The arm (31) is mounted on the shaft (34) on the bearings (36). A hydraulic or pneumatic actuator (37), equipped with a rack that engages with the pinion (35), enables the arm (31) to be pivoted about the shaft (34). At the opposite end to the actuator (37), the arm (31) carries a second shaft (39) on bearings (38). This shaft is provided with a second pinion (42) on which acts the rack of a second actuator (43). A jaw (44) is locked to the shaft (39) so that the action of the actuator (43) on the pinion (42) causes it to press against a second jaw (45). The two jaws thus form the clamp (32) located at the end of the arm (31) for performing the operations described above.

It should be noted that the rotation of the arm (31) about the axis (33), although convenient in practice, is not necessary to bring the clamp to a position just above the machining head (13). If the travel of the table with cross-slide motions (3) is sufficiently large, the movements obtained by means of the motors (4), (5) and (11) are all that is needed for this purpose. These three motors are virtually essential on any wire type EDM machine so that the extra cost of installing the clamp is therefore reduced. The arm (31) is preferably fixed above the level of the upper wire guide (16) when the head (13) is retracted upwards and above the maximum height of the workpiece (7) and its fixing clamps (not shown). Thus, the base, the arm and the clamp can in no case collide with the workpiece or its holding clamps (not shown). This simplifies the programming of the rethreading operations since it is no longer necessary to take into account the exact shape of the workpiece, which will differ from job to job. It should be noted that the clamp is not necessarily located above the upper edge of the work tank of fixed to the support (6) of the workpiece as shown in the drawing for greater clarity. It could, for example, be fixed to the sides of the work tank (2).

The method of realization of the invention as described here, which in addition to automatic straightening and rethreading of the wire after accidental breakage also makes it possible to ensures that only new lengths of wire are prepared for rethreading and to remove unusable lengths of wire, is, moreover, sufficiently simple and requires so little space that it can be easily fitted to existing machines.

I claim:

1. A device for straightening and rethreading an EDM wire comprising:
    a base fixed to a support of an EDM machine;
    an arm pivotally connected to said base about a vertical axis, said arm rotatable with respect to said axis;
    a clamp on the free end of said arm, said clamp gripping a severed end of a wire electrode, said clamp further having a capstan for winding a length of said wire to be discarded;
    a cutter for severing said wire above said capstan; and
    wherein said wire above said cutter is rethreaded through said EDM machine.

2. The invention as described in claim 1, further comprising an actuator and a shaft for pivotally engaging said arm about said base.

3. The invention as described in claim 1, further comprising a second actuator for opening and closing said clamp.

4. The invention as described in claim 1, wherein said clamp comprises first and second jaws, said first jaw locked to a second shaft, said second jaw attached to said capstan.

5. The invention as described in claim 1, wherein said capstan is configured with circumferential grooves in order to wind said discarded wire electrode without overlapping, said capstan ejecting said discarded wire upon opening of said clamp.

6. The invention as described in claim 1 and further comprising a machining head on said EDM machine, said head being capable of positioning said severed wire electrode at a height approximate with said pivoting arm and clamp.

7. The invention as described in claim 1, further comprising a drive mechanism, said mechanism capable of reverse winding of said wire electrode concurrent with said gripping of said severed end by said clamp, said wire above said cutter being straightened by tensile forces.

8. The invention as described in claim 1, wherein said arm and said clamp are capable of 180° rotation from a position away from said wire electrode to a position in contact with said severed wire electrode.

9. The invention as described in claim 1, further comprising a numerical control system, said system controlling said straightening and rethreading device.

* * * * *